F. J. OLSEN.
MULTISPEED DRIVE WITH COASTER BRAKE.
APPLICATION FILED NOV. 4, 1911.
1,233,600.
Patented July 17, 1917.
3 SHEETS—SHEET 3.
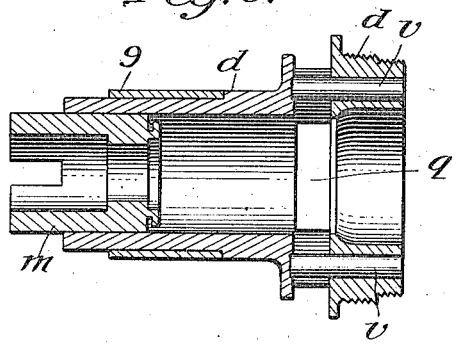
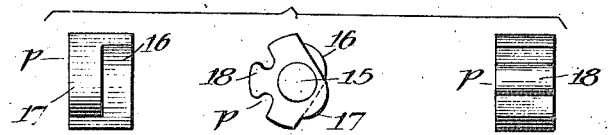
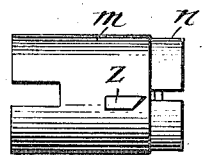 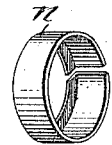
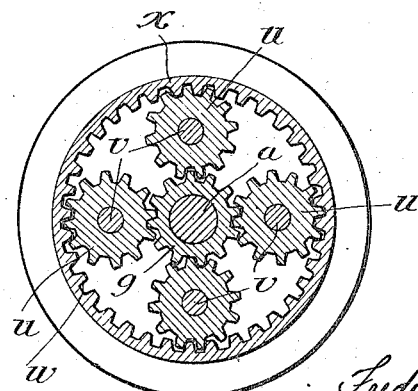
Inventor:
Frederick J. Olsen,
By
Atty.

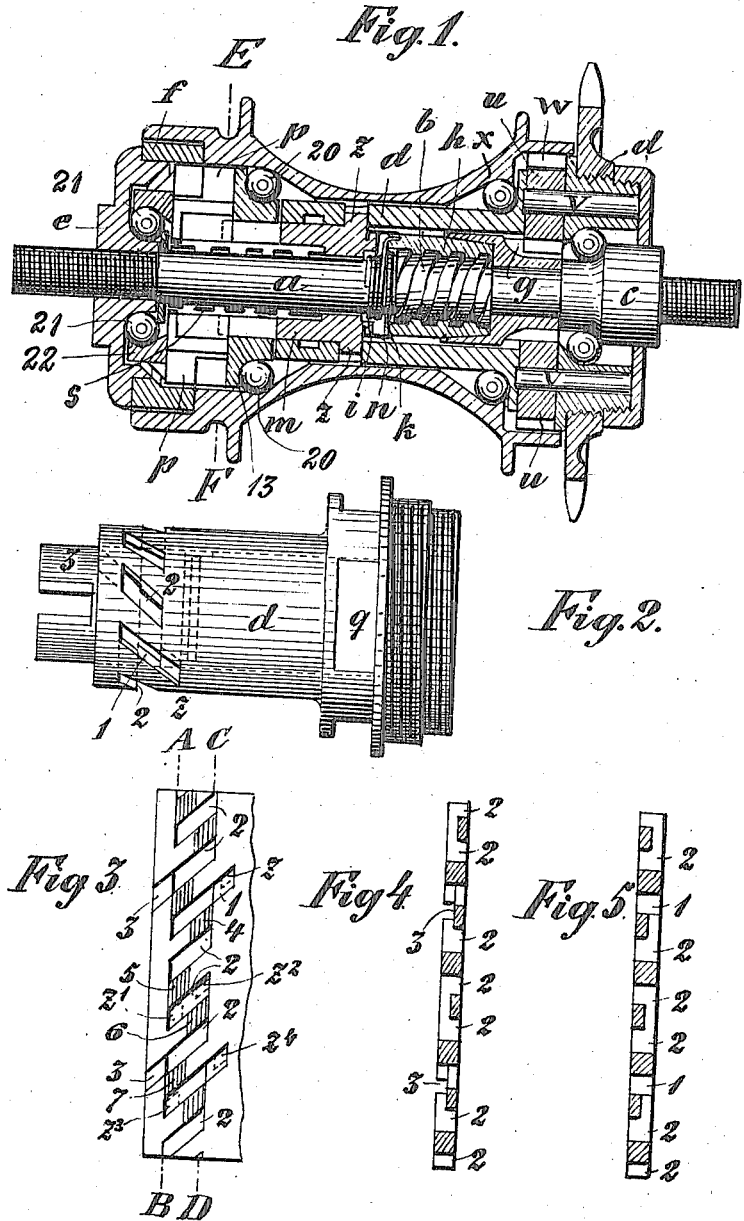

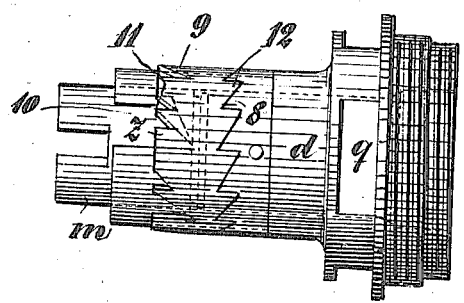
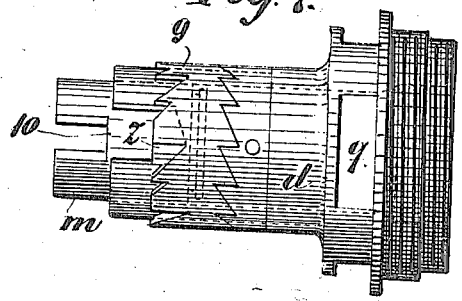
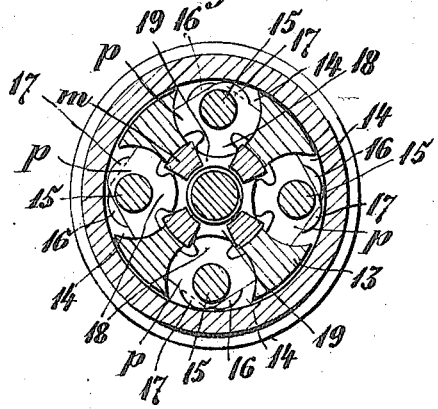

UNITED STATES PATENT OFFICE.

FREDERIK JOHANNES OLSEN, OF ESKEBJERGGAARD, PER SVEBÖLLE, DENMARK.

MULTISPEED DRIVE WITH COASTER-BRAKE.

1,233,600. Specification of Letters Patent. Patented July 17, 1917.

Application filed November 4, 1911. Serial No. 658,622.

*To all whom it may concern:*

Be it known that I, FREDERIK J. OLSEN, a subject of the King of Denmark, residing at Eskebjerggaard, per Svebölle, Denmark, have invented a new and useful Multispeed Drive with Coaster-Brake, of which the following is a specification.

Bicycle hubs are already known in which the shifting of the gearing is caused by back pedaling, and in which is found a play in circumferential direction between an inner casing connected with the sprocket wheel and a sleeve which can be fixed on the fixed shaft, which play permits the said elements to be somewhat relatively turned with respect to each other to effect the changing of the gear ratio.

The elements in question in the hitherto known hubs of this and similar kind, are, however, not used—as is the case with the present invention—for transmitting the working thrust, and the thrust by which the brake is actuated. Such an arrangement affords a great simplification in the construction and greater safety in working.

Further, free wheel hubs with back pedaling brake are known, in which the coupling member effecting the shifting of gearing at back pedaling can enter into scores of different depth in a coupling tooth rim. In such known device, however, the rider will if pedaling too far backward, return to the gearing used at the time. In the present invention, however, this drawback will be avoided, because such provisions have been made that repeated shifting of the gearing can only take place when after back pedaling a forward pedaling has each time been effected.

In the drawing:—

Figure 1 is a longitudinal section of the hub,

Fig. 2 is an inner hub-casing to be firmly connected with the sprocket wheel with a coupling member inserted therein, Fig. 3 is a development of part of the inner hub-casing, Fig. 4 is a section on the line A—B in Fig. 3, Fig. 5 is a section on the line C—D, Fig. 3, Figs. 6 and 7 are modifications of the inner hub-casing, and Fig. 8 is a section on the line E—F, Fig. 1, Fig. 9 is a longitudinal section through the center of Fig. 6, parts being removed.

Fig. 10 shows three elevational views of the part $p$ taken from different positions.

Fig. 11 is an elevation of details of my device.

Fig. 12 is an elevational view of one of the parts shown in Fig. 11.

Fig. 13 is a cross section showing the planetary gears.

The fixed shaft $a$ Fig. 1, is provided with a screw thread $b$, and a cone $c$ for a ball bearing supporting the inner hub-casing $d$. On the shaft $a$, is fastened a disk $e$, which serves for securing the brake ring $f$ against rotation. A gear $g$ is journaled loosely on the shaft $a$ between the screw thread $b$ and the cone $c$, which gear through axial displacement of the sleeve $h$ forming the nut for the thread $b$, can be coupled to or disconnected from the shaft $a$. For this purpose part of the outer surface of sleeve $h$ is cone-shaped, corresponding to a hollow cone integral with the gear $g$. The coupling of the gear $g$ to the shaft $a$ is effected by the sleeve $h$ being displaced toward and pressed against the conical flange of gear $g$. This displacement is caused normally when pedaling forward by friction between the ring $n$ and the sleeve $h$, the sleeve $h$ being carried axially due to its threaded engagement with the central fixed shaft $a$. The sleeve $h$ is acted upon by a torsion spring $i$. The spring $i$ serves to turn the sleeve $h$ completely away from the conical flange of the gear $g$ as soon as the engagement between the sleeve $h$ and the gear has been broken by back pedaling whenever the sleeve is not otherwise prevented from turning under the influence of the spring by a friction ring or member $n$, the functions of which will be hereinafter described. A shoulder $k$ on the shaft $a$ limits the displacement to the left of the sleeve $h$.

$m$ is a sleeve which is guided on the shaft $a$ and longitudinally displaceable on the same, on the end of which sleeve a slit springy ring $n$ is fastened, which ring catches around the end of the sleeve $h$. The left end of the sleeve $m$ is provided with scores 19, Fig. 8, which actuate the projections 18 of the bodies $p$, which are arranged in borings 14 in the casing 13. Said bodies are turnable on studs 15 which are preferably integral with the casing 13 and are provided with eccentric cams 16 which can engage the brake ring $f$ and with other oppositely arranged cams 17, which can engage and actuate a cylindrical surface 30 in the outer hub-casing.

When pedaling forwardly and thereby turning the sprocket wheel, the turning of the inner hub-casing $d$ and the sleeve $m$, which are coupled together in a manner described below, causes the teeth between the scores 19 to actuate the projections 18 and turn the bodies $p$ around their studs 15 in such direction that the cams 17 bear against the cylindrical surface in the outer hub-casing $x$, which is carried along by friction. On back pedaling the sleeve $m$ actuates the projections 18 and turns the bodies $p$ in the opposite direction; the cams 16 bearing against the brake ring $f$ and expanding the same so as to effect braking.

The casing 13 is supported by two ball-bearings, one of which has a series of balls 20, which roll in the outer hub-casing $x$, the other having a row of balls 21 rolling between a cone on the brake disk $l$, and a ring, 22 which is interposed between the ends of the parts of the casing 13 protruding between the bodies $p$.

The sleeve $m$ is acted upon by a spring $s$, Fig. 1. The inner hub-casing $d$ is provided with apertures $q$, Fig. 2, in which the gears $u$, Fig. 1, are journaled on pins $v$. The said gears mesh on one side with the sun-gear $g$, and on the other side with an inner tooth-rim $w$ integral with the outer hub-casing $x$. The sleeve $m$ is provided with two projections $z$, entering into grooves in the inner hub-casing $d$. The left end of this latter is provided with a number of grooves 1 forming parts of a screw line with a high pitch. The projections $z$ on the sleeve $m$ correspond with regard to their shape to the cross section of the grooves 1, so that they can slide in the same, which will be understood from Fig. 2. Two of the said grooves 1 are somewhat longer than the others, and these are arranged diametrically opposite to each other. The intermediate grooves 2 are shorter. The hatched parts 4, 5, 6 and 7, in Fig. 3, show some places where half of the wall of the casing $d$ has been cut away in order to provide a connection between the grooves 1 and 2, so that the projections $z$, the height of which is less than half of the wall thickness of the casing $d$, can be transferred from one groove to the other.

The grooves 3 serve for introducing the projections $z$ when the hub is put together.

The hub works in the following manner:

In the shown position of the parts the gear $g$ is coupled to the fixed shaft $a$. By rotating the inner hub-casing $d$, by means of the sprocket wheel, the planetary gears $u$ are forced to roll on the fixed gear $g$. The movement of the gears $u$ is transmitted through the inner tooth rim $w$ to the outer hub-casing at augmented speed. The bodies $p$ which are actuated by the sleeve $m$ and while during rotation of the sprocket wheel tend to actuate the hub-casing $x$ for forward motion, will not, in this case come into action, because the hub-casing is driven forwardly by the gears at augmented speed, thus running ahead of bodies $p$.

If now during the forward running by momentum the cranks, and with them the sprocket wheel and the inner hub-casing $d$ are kept stationary, the motion of the tooth rim $w$ will through the gears $u$ be transmitted to the gear $g$, which is thus turned backwardly. Owing to the friction between the conical surfaces of the sleeve $h$ and the gear $g$, the sleeve $h$, is shifted a short distance and is displaced to the left. The gear $g$ can hereafter, as long as the free running is carried on, be freely turned on the shaft $a$. If thereupon forward pedaling be effected, the inner hub-casing $d$ turns, by means of the projections $z$, the sleeve $m$, and therewith the springy ring $n$ fixed on the same, which again screws forwardly the sleeve $h$ to renewed engagement with the gear $g$.

If now the ratio of transmission or relative speed between the sprocket and the hub is to be changed, the rider must pedal backward far enough to render the brake mechanism $f$ active. Thus the sleeve $m$ is kept stationary as will be clear from Fig. 8, in which is shown the engagement between the projections at the left end of the sleeve $m$ and the brake mechanism. A further turning backward of the inner hub-casing $d$ causes the projections $z$ to slide along the grooves 1, whereby the sleeve $m$ is displaced a distance to the left. The projections $z$ follow the grooves 1 until they reach the connection grooves 4, Fig. 3, and hereby slide into one of the grooves 2, in which they slide on and pass through the connection-groove 5 into the position $z'$ in the next groove 2, in which position they are retained. On further back pedaling braking is effected with full power. On subsequent forward pedaling the projections $z$ are displaced, owing to the influence of the spring $s$ on the sleeve $m$, into the position $z^2$, in which they are retained until the next back pedaling. In the position $z^2$, of the projections $z$, the sleeve $m$ is displaced so much to the left, in relation to the position shown in Fig. 1, that the ring $n$ cannot actuate the sleeve $h$. This is now by the spring $i$ pressed against the shoulder $k$. On subsequent forward pedaling the movement is directly transmitted through the inner hub-casing $d$, the projections $z$, the sleeve $m$ and the bodies $p$ to the outer hub-casing $x$. On subsequent back pedaling the sleeve $m$ is, by the brake ring $f$, prevented from turning farther backward, while a further turning backward of the inner hub-casing $d$ causes the projections $z$ to move from the position $z^2$, through the connection-groove 6 into the following groove 2, where they slide upward and pass through the connection-groove 7 when they are retained in position $z^3$, whereupon braking with full power may be effected. On subsequent forward pedaling the projections $z$ slide, owing to influence of the spring $s$, to the position $z^4$, into the long grooves 1, and have now returned to the first described position, in which again an engagement between the ring $n$ and the sleeve $h$ takes place. The turning performed by the inner hub-casing $d$, before the brake comes into action with full power, is used for imparting to the sleeve $m$ an axial displacement, whereby the ring $n$ is moved into or out of engagement with the sleeve $h$, which changes the ratio of transmission of the gearing.

In the modification according to Fig. 6 the inner hub-casing $d$ acts essentially in the manner described above. The projections $z$, however, are in this modification, of a ratchet or pointed shape, and the inner hub-casing $d$ is provided with a fixed tooth rim 8. With said tooth rim co-acts a ring 9, provided with corresponding teeth, which ring can be displaced axially and is rotatable on the inner hub-casing $d$. The ring 9 is on its other edge provided with pointed scores of different depths; below the part, where are found the scores, the wall of the inner hub-casing $d$ is provided with two broad scores 10, which allow an axial displacement and a certain turning of the projections $z$. Said projections have such a height so as to reach flush with the outer surface of the ring 9, so that they can also co-act with the scores of different depths in the said ring.

This modification acts in the following manner:

In the position of the parts shown in Fig. 6 the sleeve $m$ assumes the position corresponding to that shown in Fig. 1, in which the shifting mechanism is active, the ring $n$ being far enough to the right so as to be in engagement with the sleeve $h$. On backward pedaling, the sleeve $m$ will be turned by the inner hub-casing $d$ so far backward, that the sleeve will be retained by the braking mechanism. A further back pedaling causes the projections $z$ to slide along the oblique surface of the ring 9 and, influenced by the spring $s$, fall into the shallow scores 11. The projections $z$ have hereby turned in the score 10 so far as permitted by the edges of the said score. A further back pedaling effects braking with full power. On subsequent forward pedaling the projections $z$ will retain the ring 9 and prevent the same from participating in the turning. If now the forward pedaling is continued the engagement between the toothed edge 8 on the inner hub-casing, and the toothed edge 12 on the ring 9 is shifted one tooth, the spring $s$ yielding. The projections $z$ are hereby brought back toward the other limit of the score 10, but are now found in the shallow score 11 in the ring 9, so that axial displacement of the sleeve $m$ has taken place.

The modification according to Fig. 7, only differs from that shown in Fig. 6, by the teeth pointing in the opposite direction in the inner hub-casing $d$, as well as on the ring 9, which has the effect that the shifting of the projections $z$ from one score to the next only takes place when pedaling forward again after having pedaled backward, while the arrangement according to Fig. 6 causes the shifting of the projections $z$ during backward pedaling only. In the modifications shown in Figs. 6 and 7 the change of gear ratio can take place with less turning of the inner hub-casing in relation to the sleeve $m$ than in the modification shown in Figs. 1–5.

Having now described and ascertained my said invention and in what manner same is to be performed I declare that what I claim and desire to secure by U. S. A. Letters Patent is:

1. In bicycle gearing the combination with a stationary axle having a threaded portion, a sun gear loose on said axle, a sleeve on said axle having threaded engagement with said threaded portion and adapted to lock said sun gear to said axle, a revoluble wheel hub, a driving member geared to the wheel hub and sun gear, a friction ring connected to rotate with said driving member and adapted for engagement with said threaded sleeve to actuate the same for locking the sun gear on said shaft, and means operable by said driving member for optionally shifting said friction ring into and out of engagement with said sleeve.

2. In bicycle gearing the combination with a stationary axle having a threaded portion, a sun gear loose on said axle, a sleeve on said axle having threaded engagement with said threaded portion and adapted to lock said sun gear to said axle, a revoluble wheel hub, a driving member geared to the wheel hub and sun gear, a friction ring adapted for engagement with said sleeve to actuate the same for locking the sun gear on said shaft, means operable by said driving member for rotating and for optionally shifting said friction ring into and out of engagement with said sleeve, said means comprising an inner hub provided with inclined recesses and a sleeve having at least one projection engaging in said recesses and to which sleeve said friction ring is fixed, and means operable by said last mentioned sleeve to check the rotation thereof, whereby the projection carried thereby is forced to move in the said recesses, certain of the said recesses in the inner hub being of greater axial length than others.

3. In a bicycle gearing in combination with a stationary axle having a threaded portion, a driving member, a driven member, and a multi-speed transmission between said driving and driven members, said transmission comprising a sun gear loose on said axle, a sleeve on said axle having threaded engagement with said threaded portion, and adapted to lock said sun gear to said axle, a friction ring connected to rotate with said driving member and adapted for engagement with said sleeve to actuate the same for locking the sun gear on said shaft, means whereby said sleeve may be withdrawn from said sun gear, and means operable by said driving member for optionally shifting said friction ring into and out of engagement with said sleeve, said transmission changing the relative speed of the driven member with respect to the driving member when said sun gear is locked as compared with the relative speed of the driven member when the sun gear is loose.

4. In a two speed gear apparatus in combination a wheel hub, a central fixed spindle for said hub, a driving member, and a multi-drive mechanism for transmitting motion between said driving member and said hub, said mechanism comprising a direct drive and a planetary gearing, the sun gear of said planetary gearing being supported from said fixed axle and capable of rotation thereabout, and means for automatically locking said sun gear to said axle or releasing it for rotation as desired during the operation of changing from forward to back driving and renewing the forward drive.

5. In a two speed gear apparatus in combination a wheel hub, a central fixed spindle for said hub, a driving member, and a multi-drive mechanism for transmitting motion between said driving member and said hub, said mechanism comprising a direct drive and a planetary gearing, the sun gear of said planetary gearing being supported from said fixed axle and capable of rotation thereabout, means for automatically locking said sun gear to said axle or releasing it for rotation as desired during the operation of changing from forward to back driving and renewing the forward drive, and means for braking said wheel hub by a relatively long back driving.

In testimony whereof I have affixed my signature in presence of two witnesses.

FREDERIK JOHANNES OLSEN.

Witnesses
  VIGGO BLOM,
  CECIL VILHELM SCHON.